(12) United States Patent
Huberman et al.

(10) Patent No.: US 7,386,537 B2
(45) Date of Patent: Jun. 10, 2008

(54) METHOD AND SYSTEM FOR DETERMINING SIZE OF A DATA CENTER

(75) Inventors: Bernardo Huberman, Palo Alto, CA (US); Scott H. Clearwater, Portola Valley, CA (US); Jerome Rolia, Kanata (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 10/898,128

(22) Filed: Jul. 23, 2004

(65) Prior Publication Data
US 2006/0020628 A1    Jan. 26, 2006

(51) Int. Cl.
*G06F 17/30* (2006.01)

(52) U.S. Cl. ............ 707/2; 707/3; 707/5; 707/102

(58) Field of Classification Search ............ None
See application file for complete search history.

(56) References Cited

U.S. PATENT DOCUMENTS

2005/0240668 A1* 10/2005 Rolia et al. ............ 709/223
2006/0182119 A1* 8/2006 Li et al. ............ 370/395.52

\* cited by examiner

*Primary Examiner*—Cam Y T Truong (57) ABSTRACT

A method, apparatus, and system are disclosed for determining a size of a utility date center. In one embodiment, a computer system includes a bus, a computer-readable memory coupled to the bus, and a processor coupled to the memory via the bus. The processor executes code for calculating, based on historical usage data, resource usage for a plurality of different applications of a plurality of servers in the utility data center (UDC); calculating, for each server, penalties imposed against the UDC and penalties imposed against at least one user of resources of the servers; and calculating a number of servers required to make the UDC profitable.

8 Claims, 5 Drawing Sheets

METHOD AND SYSTEM FOR DETERMINING SIZE OF A DATA CENTER

BACKGROUND

A data center may comprise many servers housed in a single location or multiple locations. Several servers may be placed within a rack, and these servers may be configured to perform specific tasks, such as on-line banking, on-line retail, web-based services, or other services.

Increasingly, data centers are used as commodities. Computing services or resources within a data center, for example, can be leased to outside sources. Such sources can enjoy the benefits of the computing resources of the data center without purchasing and maintaining the servers. For this reason, data centers may also be called a utility data center (UDC). The amount a customer is charged to utilize the computing services of a UDC may be dependent on many factors, such as overall volume of computing within the UDC, the frequency at which computing requests are made, the amount of time the UDC resources are needed, and the like.

In order to meet the demands of computing resources in a cost-effective manner, a UDC owner needs to determine the optimal size of a data center based on the rate of utilization. In other words, a UDC owner needs to know the optimal number of servers needed to satisfy the needs of customers while at the same time maintaining a profitable operation of the UDC. By way of illustration only, if a cluster of servers comprises ten computers and allocation needs for a class of customer exceed ten computers at certain times of the day, then regardless of the variance of the requests from the class, the cluster would be unable to handle the class. Likewise for multiple classes of customers, if the total number of computers needed for multiple classes at particular times of the day exceeds the available limit, the cluster would be unable to accept and run applications from the classes. If, on the other hand, the combined peak demands from the multiple classes do not exceed the number of computers, the UDC operator may have too many computers for the requisite demand.

SUMMARY

Embodiments in accordance with the present invention are directed to a method, apparatus, and system for determining a size of a data center. In one embodiment, a method, comprising: inputting, into a computer, historical usage data for a plurality of servers for a utility data center (UDC); calculating, with the computer and based on the historical usage data, potential resource usage for a plurality different applications of the servers; calculating, with the computer, for each server, penalties imposed against both the UDC and at least one user of the UDC; and calculating, with the computer, a minimum number of servers required to make the UDC profitable.

In another embodiment, a method comprises inputting, into a computer, historical usage data for a plurality of servers for a utility data center (UDC); calculating, with the computer and based on the historical usage data, potential resource usage for a plurality different applications of the servers; calculating, with the computer, for each server, penalties imposed against both the UDC and at least one user of the UDC; and calculating, with the computer, one of a net loss and a net profit for a given number of servers in the UDC.

In yet another embodiment, a computer system includes a bus, a computer-readable memory coupled to the bus, and a processor coupled to the memory via the bus. The processor executes code for calculating, based on historical usage data, resource usage for a plurality of different applications of a plurality of servers in the utility data center (UDC); calculating, for each server, penalties imposed against the UDC and penalties imposed against at least one user of resources of the servers; and calculating a number of servers required to make the UDC profitable.

Other embodiments and variations of these embodiments are shown and taught in the accompanying drawings and detailed description.

DETAILED DESCRIPTION

Figure 1:
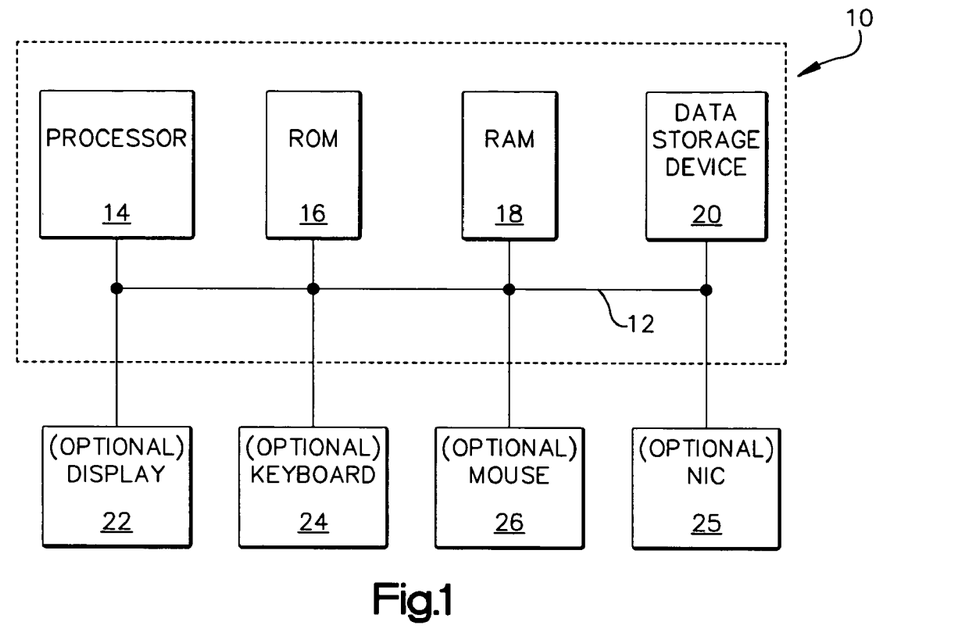
FIG. 1 illustrates an exemplary computer system in accordance with embodiments of the present invention.

FIG. 1 illustrates an exemplary computer system 10 used in accordance with embodiments of the present invention. Computer system 10 comprises a central processing unit (processor) 14 that processes information and instructions. The processor 14 couples to an address/data bus 12 that enables communication of information to other devices and systems. The processor 14 comprises any suitable microprocessor, or array of microprocessors available from various manufacturers. Computer system 10 also comprises read-only memory (ROM) 16, coupled to the processor 14, as well as random access memory (RAM) 18 coupled to the processor 14. ROM 16 comprises basic input/output system (BIOS) programs, as well as programs executed during power-on self test (POST). RAM 18 temporarily stores data and provides a working area from which the processor 14 reads and executes commands.

The computer 10 also comprises a data storage device 20 coupled to the processor 14. The data storage device 20 provides relatively long-term storage for programs and information. Data storage device 20 may comprise a disk drive, floppy drive, optical disk, and the like.

Still referring to FIG. 1, computer system 10 may optionally couple to a display device 22 upon which data or other information generated by the computer system 10 is displayed. The display device 22 comprises any suitable display or monitor, such as a cathode ray tube (CRT) based display, a liquid crystal display (LCD), and the like. Further, computer system 10 may optionally couple to a keyboard 24 and/or mouse 26. Optional keyboard 24 is used for inputting commands and data and may comprise any available full or partial data entry device or keypad. Likewise, optional mouse 26 is used for cursor control functions.

In at least some embodiments, the computer system 10 is operated as a server dedicated to specific tasks in a data center or utility data center (UDC). In server operation, a plurality of servers can be placed within a rack or enclosure, and in such a circumstance the optional display, keyboard, and mouse may not be used. The computer system 10 can also optionally comprise a network interface card (NIC) 25 coupled to the processor 14 by way of the address/data bus 12. The NIC 25 allows the computer system 10 to couple to other network devices, such as, but without limitation, other computers, switches, routers and the like.

Figure 2:
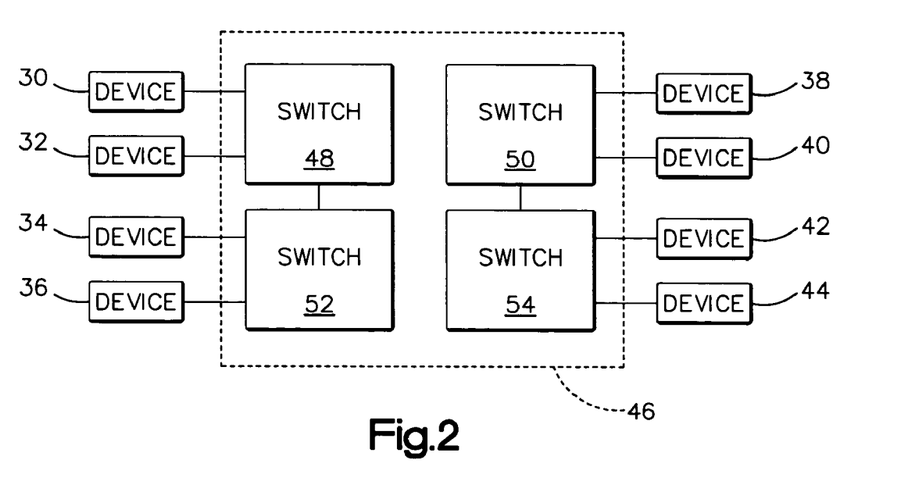
FIG. 2 illustrates an exemplary network infrastructure in accordance with embodiments of the present invention.

FIG. 2 illustrates an exemplary network infrastructure that may be used in a UDC in accordance with embodiments of the invention. In particular, FIG. 2 illustrates a plurality of devices 30-44 coupled to each other by way of a switch bank 46. Although FIG. 2 illustrates eight devices, and four switches within the switch bank 46, any number of devices and switches can be used. Further, although each switch within the switch bank 46 is coupled to only two devices, any number of devices can be coupled to each switch, depending upon the capabilities of the switch. Further, each switch may have the ability to couple to, and route packets of information to/from, more than the exemplary two switches shown in FIG. 2.

Devices 30-44 may be any suitable device, such as a plurality of computer systems 10 used as servers. Likewise, switches 48, 50, 52 and 54 may be any type of programmable device or network resource that supports creation of a local area network (LAN). A LAN may be defined to be, without limitation, a network coupling a set of logically grouped devices, such as servers. The devices coupled by a LAN may appear to each other to couple only to the other devices within the LAN, independent of the fact they may be physically coupled to many other devices. The switches 48, 50, 52, and 54 may incorporate mechanisms to ensure that only traffic authorized for a particular resource will appear on the switch ports to which that resource or device is connected.

In the embodiments illustrated in FIG. 2, each of the devices 30-44 is coupled to a respective switch 48, 50, 52 and/or 54, with no shared network segments. For example, a network interface for device 30 is coupled to switch 48, as may be a network interface for device 32. However, devices 30 and 32 can be separately coupled to switch 48 so that the network segments between these devices and a switch are shared. Thus, the switches may control all of the network traffic visible to the devices to which the switches are coupled.

In accordance with embodiments of the present invention, the switches 48, 50, 52 and 54 can be programmed (enabled and disabled) to selectively forward network traffic through the switching system 46, and hence to selectively forward network traffic from one of the devices 30-44 to another one of the devices. For example, and without limitation, a communication path between device 30 and device 44 may be created by enabling intervening switches 48, 52 and 54 (or alternatively switches 48, 50 and 54). The communication link created between devices 30 and 44 may be a LAN linking the two devices. Because the switches may control all the traffic on the switch ports, and because devices may not share the network segments linking them to the switches, network traffic sent from device 30 and intended for device 44 may only be visible to device 44, and other devices may not observe this traffic. Thus, devices that are not communicatively coupled by the LAN connection may not communicate with each other.

As noted, the network infrastructure illustrated in FIG. 2 can be implemented in a UDC environment or system. This infrastructure is meant to be illustrative. Numerous types of UDC systems can be employed with embodiments in accordance with the invention.

Figure 3A:
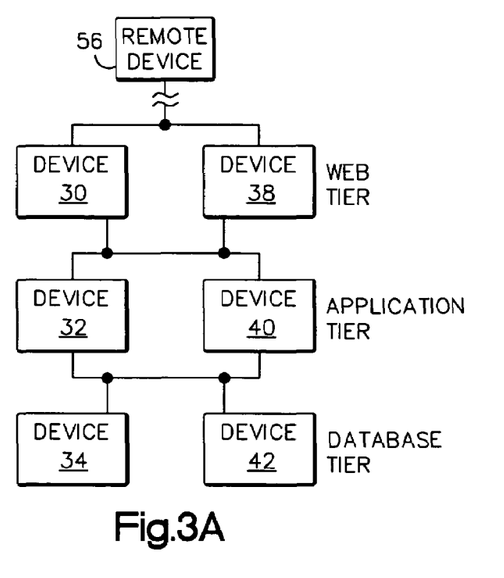
FIG. 3A illustrates a logic block diagram of an exemplary multi-tiered network configuration in accordance with embodiments of the present invention.
Figure 3B:
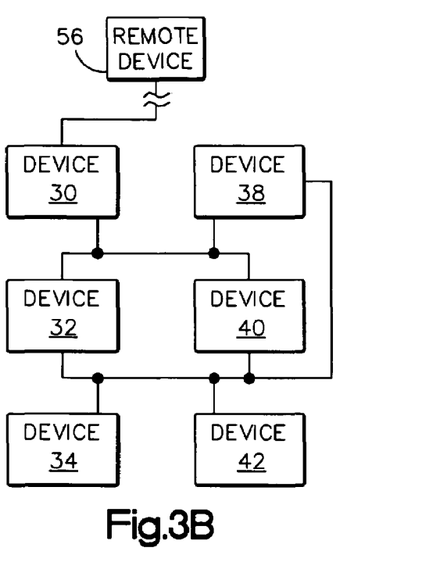
FIG. 3B illustrates a logic block diagram of a network configuration in accordance with embodiments of the present invention.
Figure 3C:
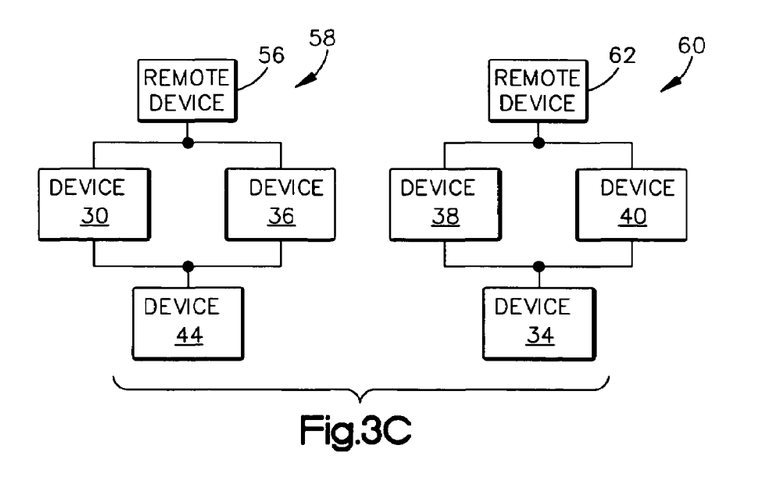
FIG. 3C illustrates a logic block diagram of a network configuration in accordance with embodiments of the present invention.

UDC systems can couple to various remote devices in numerous types of configurations. FIGS. 3A-3C illustrate exemplary configurations. These figures are illustrative and are not presented to limit embodiments in accordance with the invention.

FIG. 3A illustrates a logical block diagram of an exemplary network configuration for a multi-tiered application in accordance with embodiments of the invention. In particular, devices 30 and 38 are configured to communicate with a remote device 56, such as by communication over the Internet and/or Intranet. In this exemplary system, devices 30 and 38 are in a Web tier. Devices in the Web tier invoke devices and/or applications in an application tier. Likewise, the exemplary devices 32 and 40 in the application tier invoke programs and access data maintained by devices in a database tier, such as devices 34 and 42. Illustration of three tiers is only exemplary, and other numbers of tiers may be used without departing from the scope and spirit of the invention. Further, although FIG. 3A shows only one remote device 56 communicating with the Web tier (in particular exemplary devices 30 and 38), many such remote devices may access the overall system by way of the Web tier. Thus, by selectively enabling and disabling appropriate switches coupled between the devices, communication paths may be created such that the devices are allowed to communicate with each other. Although the switches are not illustrated in FIG. 3A, their presence or a similarly functioning device may be utilized in forming the LAN-type connections between the tiers.

As shown in FIG. 3A, the remote device 56 communicates with the exemplary devices 30 and 38 in the Web tier, but the remote device 56 may not communicate with devices in the other tiers. Similarly, devices 30 and 38 in the Web tier communicates with each other and with exemplary devices 32 and 40 in the application tier, but devices in the Web tier may not directly communicate with devices in the database tier.

FIG. 3B illustrates a logic diagram in which the LAN configuration of FIG. 3A has been reconfigured. That is, switches in switch bank 46 (FIG. 2) may be reconfigured to provide the logical connections or LANs illustrated in FIG. 3B. This reconfiguration may be at the direction of an allocation device (not specifically shown in FIG. 3B). In FIG. 3B, device 38 (which is shown to be in the Web tier in FIG. 3A) is effectively reconfigured to be part of the application tier in FIG. 3B.

FIG. 3C illustrates yet another logical block diagram for allocation of the devices of the exemplary system of FIG. 2. In particular, FIG. 3C illustrates a configuration for multiple applications, e.g., multiple customers or multiple classes of customers, in accordance with embodiments of the invention. FIG. 3C illustrates two network topologies 58 and 60 for hosting two applications. In the exemplary configuration of FIG. 3C, a remote device 56, possibly representing a first customer, is allocated devices 30, 36 and 44 from the exemplary system of FIG. 2. Thus, the various switches in the switch bank 46 are configured to couple devices 30, 36 and 44 into a LAN dedicated for use by remote device 56. Likewise, a remote device 62, possibly representing a second customer, is allocated devices 38, 40 and 34. Although FIG. 3C exemplifies that each of the exemplary systems 58 and 60 are allocated the same number of devices, the allocation of devices need not be equal.

Consider for purposes of explanation, and without limitation, a UDC comprising a plurality of devices, such as servers. Further consider that the exemplary UDC has a plurality of customers. Before proceeding, it should be understood that the system and methods described in this specification are not limited to any particular UDC configuration and/or number of servers or customers. A specific number of devices (such as servers) or customers are provided for illustration purposes. Furthermore, the resources may be, without limitation, servers within a UDC or shares of such servers, servers from within a cluster of servers (possibly within a UDC), and the like. Further yet, requests for resources of the UDC system may come from a single customer or classes of customers. Further, each class may comprise of one or more customers having applications needing allocation.

In accordance with some embodiments of the invention, a method and system provide an automatic determination of an optimal, minimal, or best size of a data center based on a rate of utilization. A UDC operator can thus determine the rate of utilization, the cost and profit as a function of the number of servers needed to satisfy customer demand, and a determination of the minimum or optimal number of servers to make operation of the UDC system profitable.

In general, a UDC operator may need to decide how to allocate resources from a group of servers, a UDC, a small subset of servers within a UDC, or the like. Specifically, a determination should be made as to whether the number of resources to allocate meet or exceed the number of resources needed by the proposed customers and/or classes or customers. However, even if sufficient resources exist, the number of resources should be cost effective for the rate or demand of resources of the UDC. Methods and systems in accordance with the invention, thus, provide an automatic calculation or determination of computing resources in a cost-effective manner to meet the demands of computing resources. A UDC owner can thus calculate the optimal size of a data center based on the rate of utilization. In other words, a UDC can calculate the optimal number of servers needed to satisfy the needs of customers while at the same time maintaining a profitable operation of the UDC.

Figure 4:
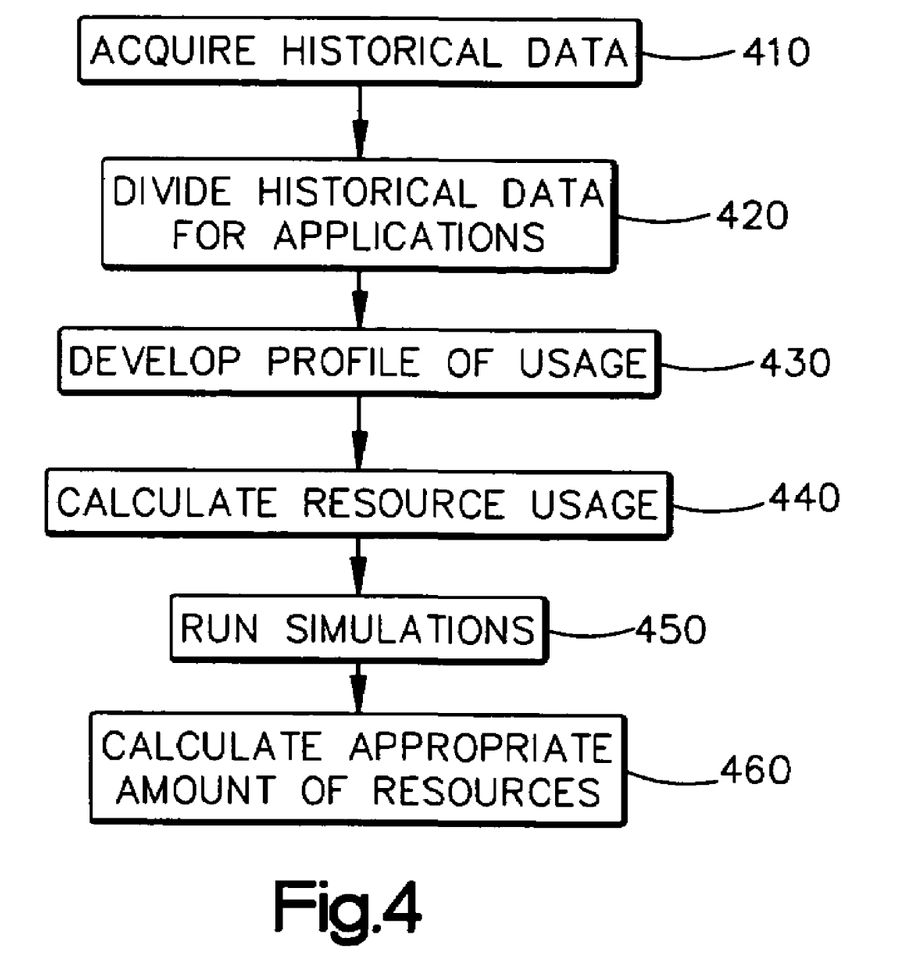
FIG. 4 illustrates a flow diagram of an exemplary method in accordance with embodiments of the present invention.

Methods and systems in accordance with the invention can be implemented for a multitude of scenarios. For example, FIG. 4 illustrates a flow diagram of an exemplary method in accordance with embodiments of the present invention. The method automatically provides a calculation or determination of resources to provide for a collection of applications in the context of the costs for providing certain levels of service as well as costs for failing to provide that level of service and charges for exceeding expected demand. The method can be used, for example, to determine an optimal size or optimal number of resources (example, servers) in a multi-resource environment (example, UDC). The method uses historical traces/data from various applications that utilize these resources.

For purposes of illustration, the resources are represented by an |R|-dimensional vector: $R=\{r_i\}=(r_1, r_2, \ldots r_{|R|})$. The applications are represented by: $A=\{a_i\}$. In general, the method takes inputs of historical resource usage, simulates possible scenarios of resource usage based on these historical usages, and reports on the various costs of the outcomes of the scenarios.

As shown in block 410, historical data is acquired. This historical data or historical traces of each resource for each application can be acquired and represented by: $r_i(a(t))$. Further, application a's desired class of service for resource i, $S(a)$, which is calculated as the fraction of time units that the UDC must provide the profiled usage.

As shown in block 420, the historical data for the applications is divided. For example, the historical traces of each application can be divided into n equal (or as equal as possible) sub-traces, $\rho(t)$. The traces can be divided into various segments. The segments, for example, can be divided by time, such as days, weeks, or months to preserve a longer degree of temporal correlation. The length of segments can depend on the amount of data. That is, the more data that is available, the longer the scale for the segment can be.

As shown in block 430, a profile of usage is developed. For example, a profile of usage can be developed from a concentration of m<n of the sub-traces while leaving n-m of the traces out for test scenarios, where m and n are integers. The test scenarios can be used in a simulation that will determine the spread in usage with respect to the environment of the other applications. The test scenarios can be used as a "cross-validation" procedure, though one skilled in the art will appreciate that other validation methods can be utilized as well.

Figure 5:
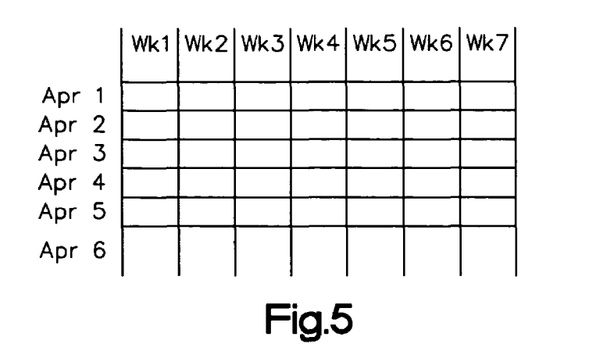
FIG. 5 is an exemplary diagram for historical usage data by week.

Each application has a time history of its usage over some period of time. FIG. 5 shows an exemplary diagram that can used for historical usage. In this figure, the diagram is arranged to divide usage data into seven weeks (Wk 1-Wk 7) for six different applications (Ap 1-Ap 6).

Figure 6:
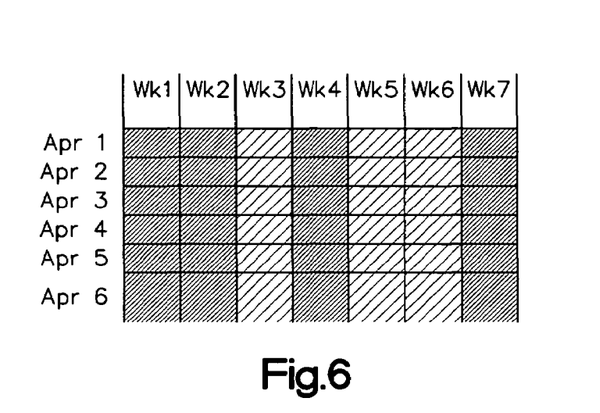
FIG. 6 illustrates the diagram of FIG. 5 with profile data and test data.

FIG. 6 illustrates the diagram of FIG. 5 with profile data and test data. Here, the darker columns of weeks (i.e., Wk 1, Wk 2, Wk 4, and Wk 7) are used as the profile data, and the lighter columns of weeks (i.e., Wk 3, Wk 5, and Wk 6) are used as test data. By keeping the time correlated at all times, whether in the profile or test data, all temporal correlations are automatically preserved between applications and within applications themselves.

By using a number of different combinations (discussed in block 450), for example, choosing three combinations out of seven possible choices, $_7C_3=7!/4!3!=35$, gives a number of scenarios that lead to a spread of possible profile usages and test usages. These usages are then used to determine a risk profile for the UDC.

As shown in block 440, a calculation of the resource usage is made. For example, using all the application profiles, a maximum possible use of each resource is determined, $R_{max}=\{R_{i,max}\}$ for each time interval, e.g., each hour of each day. For instance, in the example shown in FIG. 6, the profiled usage for application Ap 1 (Monday, 3 pm)=Max (Ap 1 (Monday, 3 pm, Wk 1), Ap 1 (Monday, 3 pm, Wk 2), Ap 1 (Monday, 3 pm, Wk 4), and Ap1 (Monday, 3 pm, Wk 7)).

Any benefits of sharing resources can be based on the different qualities of service for each resource of each application. For example, if $S_{a,i}<1$ then $R_{i,actual}<R_{i,max}$ which is where the savings to the UDC are to be found.

As shown in block 450, a simulation or simulations are run. For example, $_nC_{n-m}$ simulations can be performed or run using test traces from each application starting with $R_{max}$ resource as determined from the profiles described in block 440.

Further, penalties and exceedances can be imposed during the simulations. Further, if the UDC fails to provide the desired level of service, the UDC will be charged a penalty, or equivalently, a rebate will be provided to the owner of the application. For example, penalties $\rho_{ij}$ can be imposed against the UDC if the UDC fails to meet or provide the profiled resource requirements during any time period for resource i and application j. On the other side, exceedances can be charged to the user, customer, or remote device. For example, exceedance charges $e_{ij}$ can be imposed to the user for going beyond the profiled resource requirements during any time period. The total exceedance charge increases as the number of servers increases because more jobs can run which means there is a greater chance to exceed a profile value.

The net deviation from ideal resource allocation is calculated by the difference in penalties and exceedances for a particular resource over all the simulation runs at a specific resource allocation. The net deviation can be expressed as:

$$net_i = \sum_{s=1}^{nC_{n-m}} \rho_{is} - e_{is}$$

Figure 7:
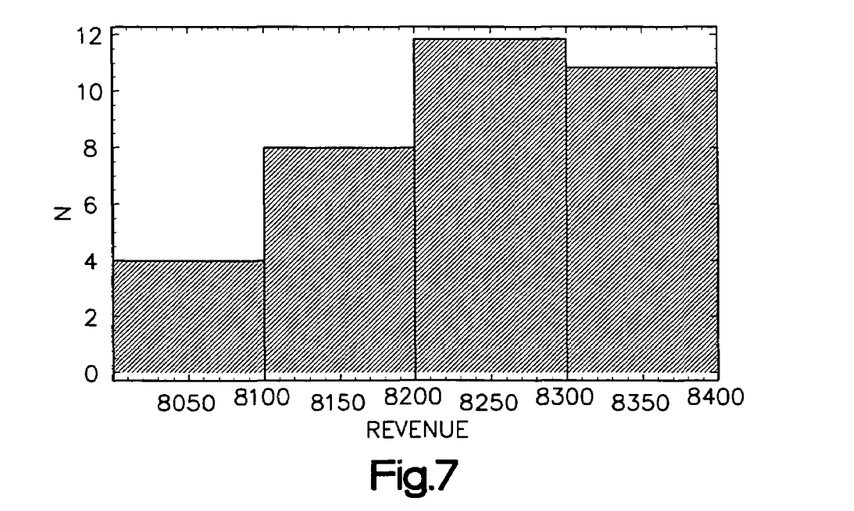
FIG. 7 illustrates a graph of spread in revenue across different combinations of profile and test cases for a given number of servers.

A cross-validation testing procedure will produce a distribution of net values for a particular set of resources. FIG. 7, for example, shows a spread in net over many trials. More specifically, FIG. 7 shows a histogram of a spread in revenue across 35 different combinations of profile and test cases for a fixed number of servers. Here, the histogram illustrates the net values returned from the cross-validation procedure. Along the Y-axis, N is the number of times that $net_i$ fell within the range of each histogram bin. Thus, the entries in the bin are: $4+8+12+11=35=_7C_3$. The histogram could be displayed, for example, to the operator of a UDC to illustrate a qualitative idea of the risk involved with a particular configuration.

If $<net_i>>0$ then the penalties to the UDC are too high, and the amount of resource i should be increased by some amount $\delta r_i$ to bring $<net_i>$ closer to zero. A slightly positive $<net_i>$ will yield a small profit to the UDC to take into account future expansion plans and account for risk due to fluctuations in usage. On the other hand, if $<net_i><0$ then the excedances to the user are too high, and the amount of resource i should be decreased by some amount $\delta r_i$ to bring $<net_i>$ closer to zero.

Figure 8:
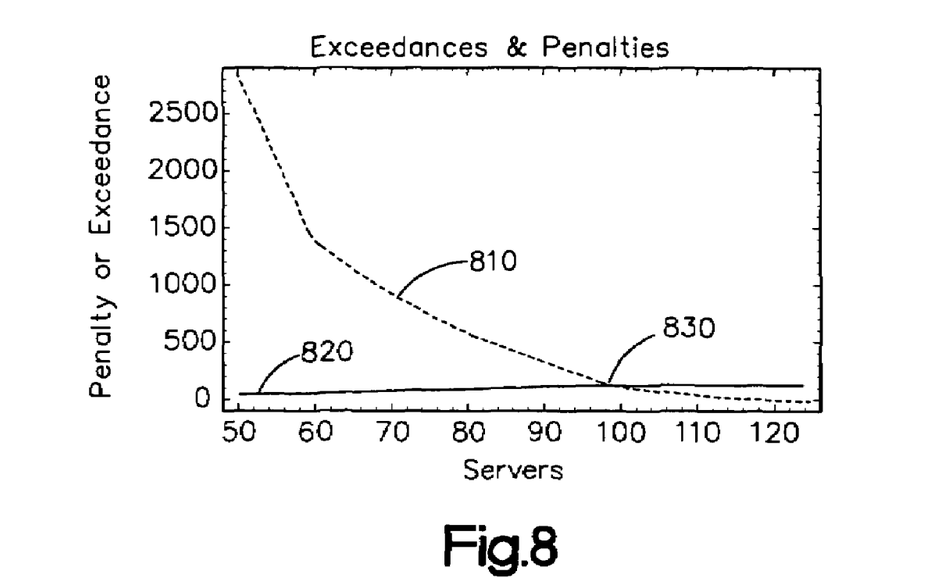
FIG. 8 illustrates a graph of penalties paid by the UDC or exceedances paid by the customer (Y-axis) for a given number of servers (X-axis).

As shown in block 460, a calculation is made of the appropriate amount of resources when the number of applications and customers is fixed. FIG. 8 illustrates a graph of penalties or exceedances (Y-axis) for a given number of servers (X-axis). This figure shows how the penalties and exceedances usages vary with the amount of resource. Line 810 shows the exceedance or penalty that users will pay. As shown, as the number of servers increases, the amount of penalty or exceedance decreases. Line 820 shows the cost to the UDC of having a given number of resources (example, servers). As the number of servers increases, the cost to the UDC increases. At point 830, line 810 crosses line 820. This point 830 represents the optimal or correct size of the UDC. In other words, this point represents an optimal number of servers to make operation of the UDC system profitable. At an optimal operation, adding more servers makes the UDC unprofitable, and subtracting servers increases the fee paid by the customer. Of course, the customer could pay more, but because of potential competition from other UDCs or providers, each UDC provider wants to provide as low a cost as deemed reasonable. This crossing point will depend on many factors, such as, but not limited to, the interactions between the profiles, the classes of service, the cost structure of the UDC for failing to meet a class of service (example, failing to supply a previously agreed amount of resource to a customer), and the cost structure of the users for exceeding the profile (example, the penalty imposed to a customer for utilizing more of a resource than previously agreed with the UDC).

In FIG. 8, for illustration purposes, penalties and exceedances are measured in central processing unit (CPU) hours with respect to a given distribution of servers and application traces. Alternatively, different criteria can be utilized. For example, the costs of exceedances and penalties may be used, but the qualitative shape of the curves will not change.

By repeating the simulations over and over with different levels of resource, an optimal amount of each resource i can be found within some tolerance $\epsilon_i \approx 0$. Also, the spread in the net value, $\sigma_{net}$, can be determined for each level of resource. Ideally, the net deviation is expressed as: $<net_i>=0$ and $\sigma_{net}=0$.

The value $\sigma_{net}$ is a measure of the risk incurred by the UDC under the particular conditions of that simulation. Thus, a curve of risk ($\sigma_{net}$) and reward ($<net_i>$) can be constructed where each point corresponds to a "portfolio" of applications, resources, and cost structure. The UDC may then choose to operate with optimal performance defined by the risk and reward characteristics of various portfolios. Further, the UDC may choose to operate with an "efficient frontier." The efficient frontier is the part of the risk/reward curve where for every point on the curve there is at least one point on the efficient frontier that is always preferable, that is, has a lower risk or higher reward, or both.

Figure 9:
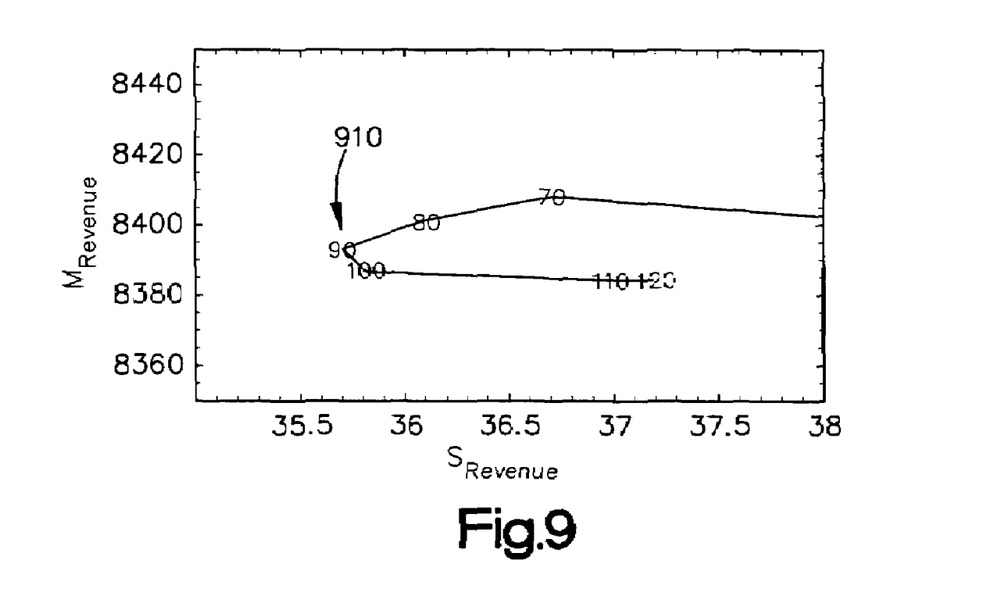
FIG. 9 illustrates a graph of risk and reward for a given number of servers.

FIG. 9 shows the risk and reward trade-offs from different resource levels with applications and service levels held fixed. Here, the X-axis ($\sigma_{Revenue}$) represents risk variability, and the Y-axis ($\mu_{Revenue}$) represents revenue for the UDC (i.e., how much money or income the UDC receives).

As shown in FIG. 9, seventy servers has a larger revenue stream for the UDC than, for example, eighty servers. However, seventy servers also have a higher risk as measured by variability than eighty servers. Note though, that an optimal performance or best revenue with the lowest risk occurs at point 910. At this location, the number of servers is about ninety. Thus, for the illustrative scenario, ninety servers provides the best return (Y-axis, money) for a given amount of risk (X-axis, risk) from the perspective, for example, of the efficient frontier.

Embodiments in accordance with the present invention can be implemented in a variety of networks, and such networks are not limited to computing networks (such as the network discussed in connection with FIGS. 2-3). For example, other types of digital communication networks are also applicable. Such networks include, but are not limited to, a digital telephony network, a digital television network, or a digital cable network, to name a few examples.

FIG. 4 provides a flow diagram in accordance with embodiments of the present invention. The diagram is provided as an example and should not be construed to limit other embodiments within the scope of the invention. For example, the blocks should not be construed as steps that must proceed in a particular order. Additional blocks/steps may be added, some blocks/steps removed, or the order of the blocks/steps altered and still be within the scope of the invention.

In the various embodiments in accordance with the present invention, embodiments are implemented as a method, system, and/or apparatus. As one example, the embodiment can be implemented as one or more computer software programs to implement the method of FIG. 4. The software may be implemented as one or more modules (also referred to as code subroutines, or "objects" in object-oriented programming). The location of the software (whether on the client computer or elsewhere) will differ for the various alternative embodiments. The software programming code, for example, can be accessed by the microprocessor of the computer or server from long-term storage media of some type, such as a CD-ROM drive or hard drive. The software programming code may be embodied or stored on any of a variety of known media for use with a data processing system or in any memory device such as semiconductor, magnetic and optical devices, including a disk, hard drive, CD-ROM, ROM, etc. The code may be distributed on such media, or may be distributed to users from the memory or storage of one computer system over a network of some type to other computer systems for use by users of such other systems. Alternatively, the programming code may be embodied in the memory, and accessed by the microprocessor using the bus. The techniques and methods for embodying software programming code in memory, on physical media, and/or distributing software code via networks are well known and will not be further discussed herein. Further, various calculations or determinations (such as those illustrated in FIGS. 6-9) can be displayed (for example on a display) for viewing by a user (such as a UDC operator).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable storage medium having computer-readable program code embodied therein for causing a computer system to perform:

receiving historical data for a plurality of resources for plural applications in a utility data center (UDC);

dividing the historical data for each application into n sub-traces;

developing a profile of usage for at least n minus m sub-traces, where n and m are integers and m<n;

running a simulation using a maximum usage of at least one resource;

calculating a net deviation using penalties imposed against the UDC and exceedances imposed against a resource user of the UDC;

calculating, based on the net deviation, a number of resources for the UDC to be profitable; and outputting the number of resources.

2. The computer readable storage medium of claim 1 for causing the computer system to further perform calculating a maximum usage of each resource for an interval of time.

3. The computer readable storage medium of claim 1 for causing the computer system to further perform dividing the n sub-traces into segments of time.

4. The computer readable storage medium of claim 3 wherein the segments of time are selected from one of days, weeks, and months.

5. The computer readable storage medium of claim 1 wherein dividing the historical data further comprises dividing each application into an equal number of sub-traces.

6. The computer readable storage medium of claim 1 wherein the penalties are imposed against the UDC for failing to provide a previously agreed resource to the resource user, and the exceedances are imposed against the resource user for utilizing more than a previously agreed amount of a resource.

7. The computer readable storage medium of claim 1 the resources are servers.

8. The computer readable storage medium of claim 1 for causing the computer system to further perform displaying a risk versus revenue comparison for multiple different numbers of resources for which the UDC can profitably operate.

* * * * *